K. TSUCHIYA

LIQUID CONTAINER

Sept. 29, 1931. Original Filed March 19, 1929 Re. 18,215

Konosuke Tsuchiya INVENTOR.

BY Harry A. Toulmin

ATTORNEYS.

Reissued Sept. 29, 1931

Re. 18,215

UNITED STATES PATENT OFFICE

KONOSUKE TSUCHIYA, OF SAUSALITO, CALIFORNIA

LIQUID CONTAINER

Original No. 1,776,458, dated September 23, 1930, Serial No. 348,167, filed March 19, 1929. Application for reissue filed November 8, 1930. Serial No. 494,437.

The present invention relates to improvements in liquid containers and more particularly to that type of container commonly known as a milk bottle or receptacle, but also adaptable for other uses, such as for ice cream, semi-liquid foods and the like.

The invention consists primarily in a tubular body and a closure therefor, preferably of compressed paper pulp structure suitably coated to prevent liquid penetration, and which may be cheaply manufactured and readily disposed of when its use is discontinued.

Among its objects, the present invention affords a container body open at its opposite ends and adapted for storage or being stacked in nested formation, enabling the conservation of space. Another object is the provision of a groove adjacent an end portion of the body wall which affords a circumferential reinforcement for the lower edge of the container, and maintains a closure member out of contact with the surface upon which the container rests, this being desirable for sanitary reasons.

A further object is to provide a closure member insertable into the container through its open end and which has tight seating contact against the walls of the body by resiliency of its material, and therein maintained by seating upon the groove, and which is further forced into contact with said groove by the weight of the contents of the container.

With the above mentioned and other objects in view, the invention consists in the novel construction and combination of parts hereinafter described, illustrated in the accompanying drawings and pointed out in the claims hereto appended; it being understood that various changes in the form, proportion, size and minor details of construction within the scope of the claims may be resorted to without departing from the spirit or sacrificing any of the advantages of the invention.

To more clearly comprehend the invention, reference is directed to the accompanying drawings, wherein—

Figure 1:
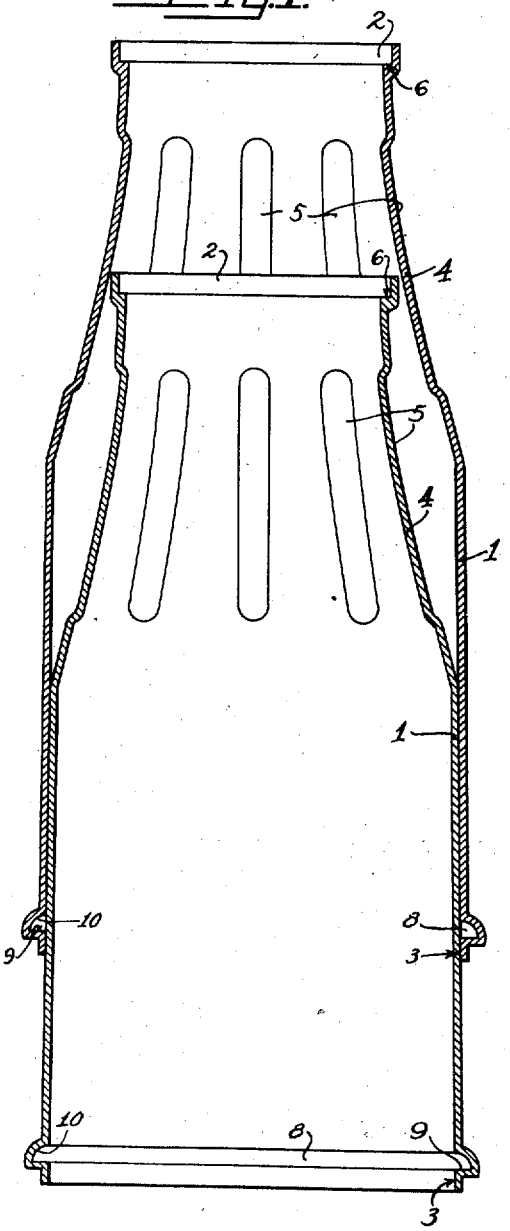
Figure 1 is a view in vertical section of a plurality of one embodiment of my improved containers in nested formation.

Referring more particularly to the drawings wherein like characters of reference designate corresponding parts, 1 indicates a tubular cylindrical body, open at its upper end at 2, and at its lower end at 3. The member 1 is preferably constructed of heavy paper, which is a well known product having sufficient flexibility for bending and forming, such as paraffined stock, or is formed from paper pulp by any of the well known methods, with its surface, particularly its inner surface, coated to preclude the admission of moisture thereinto. The tubular body may be of any suitable shape, but as illustrated the upper end of the body 1 is tapered at 4 and may be vertically ribbed at 5, the ribs affording strengthening means for the neck of the body. In this form, the body member 1 slightly tapers or flares from a point below its neck to its bottom edge, enabling successive bodies, when their closures are eliminated from the ends, to be arranged in telescopic or nested formation, as in Figure 1.

At its extreme upper end the body 1 is formed with a closure cap seat 6, on which is adapted to rest the peripheral edge of a conventional milk bottle closure or cap 7.

Near its lower end the body 1 is circumferentially grooved at 8, the groove preferably opening on the inner surface of the body and the corrugation of the wall of the groove 8 affording a circumferential reinforcing rib for the lower portion of the body 1. The groove is provided with a bottom wall portion 9 which may be of suitable form or shape adapted to support the closure member and for purpose of illustrating the interlocking of closure in the groove is shown in the preferred embodiment with the bottom wall disposed at substantially right angles to the wall of the receptacle and is further provided with an upwardly and inwardly curved wall 10 connecting the outer peripheral edge portion of the bottom wall with the wall of the body 1.

Figure 2:
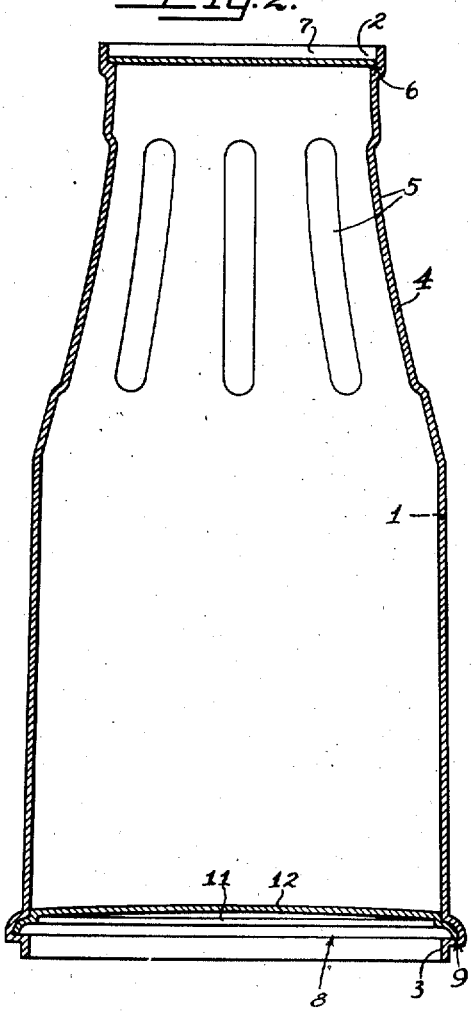
Figure 2 is a similar view with a closure cap and bottom closure in position.
Figure 3:
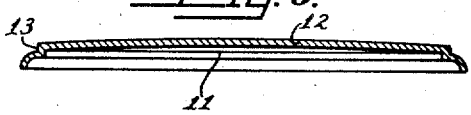
Figure 3 is a view in detail cross section of the bottom closure.

The closure member comprises an inverted saucer-like disc 11, preferably of material which is sufficiently flexible to be readily formed by a die, and having sufficient resiliency so that when it is formed it may be slightly deformed and yet spring back to its formed shape. The disc 11 is of a diameter for snug reception of its peripheral portion into the groove 8. The body of said disc is formed with a crowned center top portion or plane 12, from the edge of which depends a circumferential wall or skirt 13 which, with relation to the crowned plane 12, is disposed substantially vertically, but may be slightly inclined radially outwardly if a conical container body is used in conjunction therewith. The closure wall or skirt 13 of the disc is curved in cross section preferably to correspond with the cross sectional curvation of the groove 8, so that when the closure is placed within the end portion of body 1 the vertical portion of the skirt by reason of the above mentioned resiliency snugly contacts with the inner surface of the wall of body 1 immediately above the groove 8, as in Figure 2. The disc 11 is inserted in position by slightly distorting the same and forcing it upwardly into the body 1 through its open end, the edges of the disc springing into place, as in Figure 2, thus reinforcing the bottom portion of the body 1; and the spring action or resiliency of the material, superinduced by the crowned plane 12 of the disc, exerts a pressure radially outward of the vertical portion of the skirt 13, including the curved portion thereof within the groove 8, so that a leak-proof contact is formed between the disc and container body 1.

As the receptacle receives its contents, the weight of the contents added on the crown center tends to force the same into a horizontal plane, and in doing so more tightly forces the skirted portion of the disc against the wall 1 and into the groove 8.

When the container is used for a dry commodity, it may be disassembled and used a succeeding time, but it is designed preferably for ready disposal after being used for a wet commodity, and without a serious financial loss to the user.

I claim:—

1. A liquid container comprising a tubular container body of rigid structure having a frustum conical upper portion superposed on a cylindrical lower portion, which lower portion is provided in its wall near and in spaced relation to its open bottom with a circumferential groove opening inwardly into the container, said groove provided with a bottom wall disposed at substantially right angles to the wall of the receptacle, and further provided with an upwardly and inwardly curved wall connecting the outer edge of the bottom wall of the groove with the container wall, a disc-shaped bottom closure having a crowned center and peripherally flanged to correspond to said groove, said bottom closure adapted for insertion into the container through its bottom.

2. A liquid container comprising a tubular receptacle structure open at its opposite ends and outwardly flaring from top to bottom to adapt the same for nesting and providing a tapering shoulder within its length, the wall of said receptacle being plurally grooved intermediate the shoulder and top and being provided near and in spaced relation to its lower edge with an integral outwardly disposed annular bottom wall seat, the lower surface of which lies at substantially right angles to the inner wall of the receptacle, and a bottom closure of crowned formation for upward insertion into the receptacle with its edge snugly fitting said seat, the top portion of said receptacle walls being formed outwardly providing a circular opening adapted to receive a closure cap therethrough, and having associated with said opening a shoulder adapted to receive and support the closure cap.

3. A container comprising a tubular body portion open at an end thereof and provided adjacent said end with an integrally formed inwardly opening annular groove, and an inverted saucer-like closure member adapted to close said end opening, said closure member being formed of material having a coefficient of resilience and flexibility and having a plane portion and a depending skirt portion flared radially outward from top to bottom, said skirt portion having an annular radially projecting portion adapted to seat within the groove of the body portion and said closure member being adapted to engage the inner wall of the tubular body responsive to its resilience.

4. A container comprising a tubular body portion open at an end thereof and provided adjacent said end with an integrally formed inwardly opening annular groove, and a deformable inverted saucer-like closure member adapted to close said end opening, said closure member being formed of material having a coefficient of resilience and flexibility and having a crowned plane portion and a depending skirt portion flared radially outward from top to bottom, said skirt portion having an annular radially projecting portion adapted to seat within the groove of the body portion and said closure member being adapted to engage the inner wall of the tubular body responsive to its resilience.

5. A container comprising a tubular body portion open at an end thereof and provided adjacent said end with an integrally formed inwardly opening annular groove, and an inverted saucer-like closure member adapted to close said end opening, said closure member being formed of deformable sheet material of substantially uniform thickness and having a plane portion, and a depending skirt portion flared radially outward from top to bottom, the said skirt portion having an annular radially projecting portion adapted to seat within the groove of the body portion, responsive to resiliency of said sheet material.

6. A container comprising a tubular body portion open at an end thereof and provided adjacent said end with an integrally formed inwardly opening annular groove, and an inverted saucer-like closure member adapted to close said end opening, said closure member being formed of deformable sheet material of substantially uniform thickness and having a crowned plane portion, and a depending skirt portion flared radially outward from top to bottom, the said skirt portion having an annular radially projecting portion adapted to seat within the groove of the body portion, responsive to resiliency of said sheet material.

In testimony whereof I have affixed my signature.

KONOSUKE TSUCHIYA.